(12) United States Patent
Latta et al.

(10) Patent No.: US 9,851,787 B2
(45) Date of Patent: Dec. 26, 2017

(54) DISPLAY RESOURCE MANAGEMENT

(71) Applicant: Microsoft Technology Licensing, LLC, Redmond, WA (US)

(72) Inventors: Stephen Latta, Seattle, WA (US); Jedd Anthony Perry, Monroe, WA (US); Rod G. Fleck, Bellevue, WA (US); Jack Clevenger, Woodinville, WA (US); Frederik Schaffalitzky, Mercer Island, WA (US); Drew Steedly, Redmond, WA (US); Daniel McCulloch, Kirkland, WA (US); Ian McIntyre, Redmond, WA (US); Alexandru Balan, Redmond, WA (US); Ben Sugden, Woodinville, WA (US); Ryan Hastings, Seattle, WA (US); Brian Mount, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 291 days.

(21) Appl. No.: 13/689,379

(22) Filed: Nov. 29, 2012

(65) Prior Publication Data
US 2014/0145914 A1 May 29, 2014

(51) Int. Cl.
G06F 3/01 (2006.01)
G06F 1/32 (2006.01)
(Continued)

(52) U.S. Cl.
CPC .......... G06F 3/013 (2013.01); G02B 27/017 (2013.01); G06F 1/325 (2013.01); G06F 1/3215 (2013.01);
(Continued)

(58) Field of Classification Search
CPC ...... G06F 3/0346; G06F 1/325; G06F 1/3265; G06F 3/013; G06F 3/017; G06F 1/3215;
(Continued)

(56) References Cited

U.S. PATENT DOCUMENTS 6,124,976 A 9/2000 Miyazaki
6,279,058 B1 8/2001 Gulick
(Continued)

FOREIGN PATENT DOCUMENTS

CN 1613025 A 5/2005
CN 101496400 A 7/2009
(Continued)

OTHER PUBLICATIONS

Pottie, G.J., "Wireless Integrated Network Sensors (WINS): Principles and Practice", Retrieved at <<www.ee.ucla.edu/~pottie/papers/smallWINS_ACM.pdf>>, v.43 n.5, May 2000, pp. 51-58.
(Continued)

Primary Examiner — Amare Mengistu
Assistant Examiner — Gloryvid Figueroa-Gibson
(74) Attorney, Agent, or Firm — Alleman Hall Creasman & Tuttle LLP

(57) ABSTRACT

A system and related methods for a resource management in a head-mounted display device are provided. In one example, the head-mounted display device includes a plurality of sensors and a display system for presenting holographic objects. A resource management program is configured to operate a selected sensor in a default power mode to achieve a selected fidelity. The program receives user-related information from one or more of the sensors, and determines whether target information is detected. Where target information is detected, the program adjusts the selected sensor to operate in a reduced power mode that uses less power than the default power mode.

19 Claims, 6 Drawing Sheets

(51) Int. Cl.
*G02B 27/01* (2006.01)
*G02B 27/00* (2006.01)

(52) U.S. Cl.
CPC ........ *G06F 1/3265* (2013.01); *G02B 27/0093* (2013.01); *G02B 2027/014* (2013.01); *G02B 2027/0174* (2013.01); *G02B 2027/0187* (2013.01); *G06F 1/3287* (2013.01); *Y02B 60/1242* (2013.01); *Y02B 60/1282* (2013.01)

(58) Field of Classification Search
CPC ..... H04N 2005/4432; H04N 21/42222; H04N 5/4403; G02B 2027/014; G02B 2027/0174; G02B 2027/0187; G02B 27/0093; G02B 27/017; Y02B 60/1242; Y02B 60/1282
USPC .......................................... 345/7–9, 632–633
See application file for complete search history.

(56) References Cited

U.S. PATENT DOCUMENTS

| | | | |
|---|---|---|---|
| 6,690,351 B1* | 2/2004 | Wong | G06F 1/163 345/156 |
| 7,565,562 B2 | 7/2009 | Chary | |
| 8,036,690 B1 | 10/2011 | Delker et al. | |
| 8,184,067 B1* | 5/2012 | Braun | G09G 5/00 345/7 |
| 8,235,529 B1* | 8/2012 | Raffle | A61B 3/113 351/209 |
| 2002/0040377 A1 | 4/2002 | Newman et al. | |
| 2004/0175020 A1 | 9/2004 | Bradski et al. | |
| 2005/0198257 A1 | 9/2005 | Gupta et al. | |
| 2005/0248852 A1* | 11/2005 | Yamasaki | G02B 27/0093 359/630 |
| 2006/0053011 A1 | 3/2006 | Kim | |
| 2006/0087502 A1 | 4/2006 | Karidis et al. | |
| 2006/0103591 A1* | 5/2006 | Tanimura | G06F 1/3218 345/8 |
| 2007/0113207 A1* | 5/2007 | Gritton | G06F 3/017 715/863 |
| 2008/0068559 A1 | 3/2008 | Howell et al. | |
| 2011/0075257 A1* | 3/2011 | Hua | G02B 27/017 359/464 |
| 2011/0134251 A1* | 6/2011 | Kim | H04N 5/232 348/164 |
| 2012/0242560 A1* | 9/2012 | Nakada | G09G 3/3406 345/8 |
| 2012/0242570 A1 | 9/2012 | Kobayashi | |
| 2013/0080811 A1* | 3/2013 | Low | G06F 3/033 713/323 |
| 2013/0106681 A1* | 5/2013 | Eskilsson | G06K 9/00597 345/156 |
| 2013/0135204 A1 | 5/2013 | Raffle et al. | |
| 2013/0198685 A1* | 8/2013 | Bernini | G06F 3/0484 715/800 |

FOREIGN PATENT DOCUMENTS

| | | |
|---|---|---|
| EP | 2073098 A2 | 6/2009 |
| JP | 2001100870 A | 4/2001 |
| JP | 2004312401 A | 11/2004 |
| JP | 2005025563 A | 1/2005 |
| WO | 2012040030 A2 | 3/2012 |

OTHER PUBLICATIONS

Chowdhury, Helal, "Adaptive Multi Rate Awake-Sleep Cycle in Heterogeneous Sensor Network", Retrieved at <<http://www.ee.oulu.fi/~carlos/WSN_Presentations_and_Papers/Helal_paper.pdf>>, Retrieved Date: Mar. 30, 2012, pp. 8.

Jea, David, "Connecting Body Sensor Networks to Pervasive Computing Environments", Retrieved at <<http://citeseerx.ist.psu.edu/viewdoc/download?doi=10.1.1.178.9515&rep=rep1&type=pdf>>, Retrieved Date: Mar. 30, 2012, pp. 37.

Gordon, et al., "Using Prediction to Conserve Energy in Recognition on Mobile Devices", Retrieved at <<http://www.teco.edu/~ding/publications/Embedded_Classifier_Embedded_Fonts.pdf>>, 2011 IEEE International Conference on Pervasive Computing and Communications Workshops (PERCOM Workshops), Mar. 21, 2011, pp. 364-367.

Naik, Kshirasagar, "A Survey of Software Based Energy Saving Methodologies for Handheld Wireless Communication Devices", Retrieved at <<https://ece.uwaterloo.ca/~snaik/energy.pdf>>, Proceedings: Department of Ece, University of Waterloo: Technical Report No. 2010-13, Retrieved Date: Mar. 30, 2012, pp. 1-46.

Hamza-Lup, Felix G. et al., "Sensors in Distributed Mixed Reality Environments", retrieved at <<http://www.iiisci.org/Journal/CV$/sci/pdfs/P476633.pdf>>, Proceedings: Journal of Systemics, Cybernetics and Informatics, vol. 3(2), Retrieved Date: Mar. 30, 2012, pp. 96-101.

ISA European Patent Office, International Search Report and Written Opinion Issued in Application No. PCT/US2013/072476, dated Sep. 23, 2014, WIPO, 10 Pages.

IPEA European Patent Office, Written Opinion of the International Preliminary Examining Authority Issued in Application No. PCT/US2013/072476, dated Dec. 12, 2014, WIPO, 6 pages.

IPEA European Patent Office, International Preliminary Report on Patentability Issued in Application No. PCT/US2013/072476, dated Mar. 30, 2015, WIPO, 11 pages.

The State Intellectual Property Office of the People's Republic of China, First Office Action and Search Report Issued in Chinese Patent Application No. 201380062662.5, dated Mar. 1, 2017, 15 Pages. (Submitted with Partial English Translation of First Office Action and Search Report).

Japan Patent Office, Office Action Issued in Japanese Patent Application No. 2015-545482, dated Jul. 4, 2017, Japan, 8 pages. (Submitted with partial English Translation of Office Action).

The State Intellectual Property Office of China, Second Office Action Issued in Chinese Patent Application No. 201380062662.5, dated Sep. 4, 2017, China, 6 pages. (Submitted with partial English Translation of Office Action).

Japan Patent Office, Decision to Grant a Patent (Notice of Allowance) issued in Japanese Patent Application No. 2015545482, dated Oct. 17, 2017, Japan, 3 pages. (Submitted without English translation).

* cited by examiner

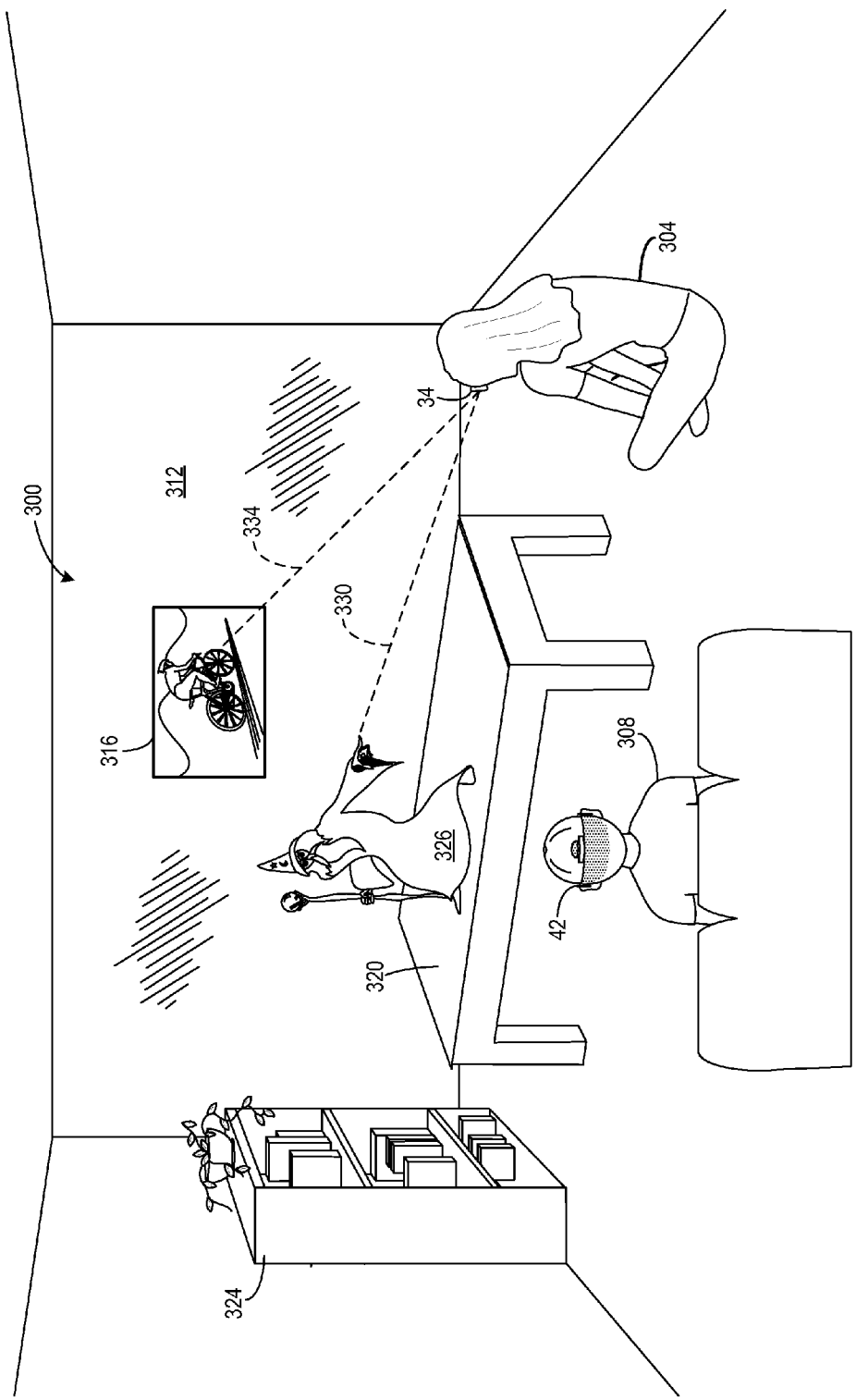

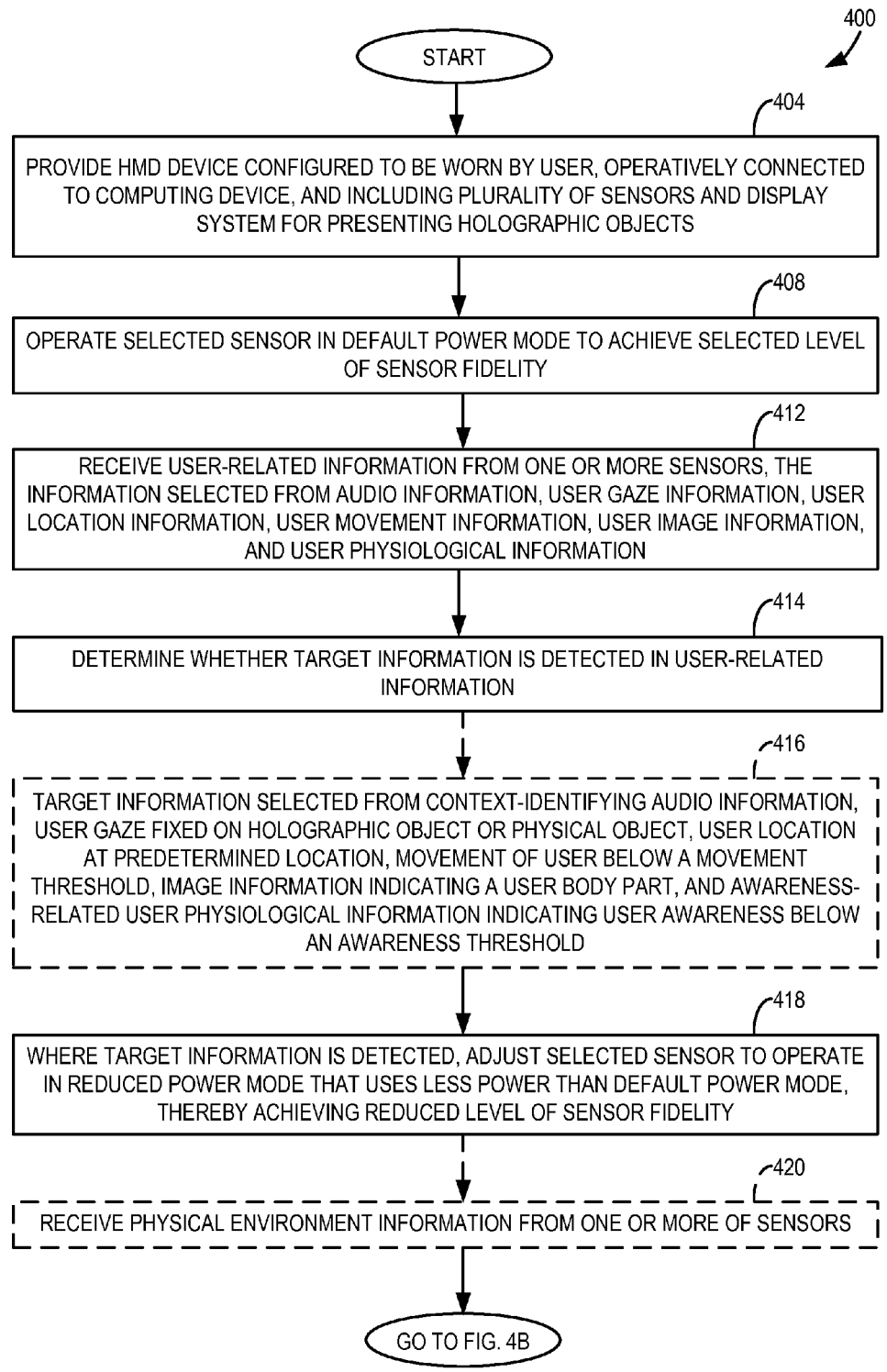

DISPLAY RESOURCE MANAGEMENT

BACKGROUND

An augmented reality device such as a head-mounted display device may include multiple sensors that generate various forms of input data. Each of the sensors consumes power in capturing and processing the input data. Such sensors may include, for example, microphones, image sensors, depth cameras, eye-tracking sensors, and location sensors. Continuous operation of these sensors may consume significant amounts of power and potentially reduce battery life of the head-mounted display device. Additionally, in some examples data from one or more sensors may be transmitted over a network. Continuous transmission of such input data can also consume a significant amount of power as well as network resources.

In addition to acceptable battery life, users of an augmented reality device also desire a consistent, high quality augmented reality experience. While turning off or reducing power delivered to one or more sensors may reduce power consumption and/or network demands, such power fluctuations may also degrade the augmented reality experience provided by the augmented reality device.

SUMMARY

To address the above issues, a resource management system including a head-mounted display device and related methods are provided. In one example, the head-mounted display device is configured to be worn by a user and is operatively connected to a computing device. The head-mounted display device also includes a plurality of sensors and a display system for presenting holographic objects.

The resource management system further includes a resource management program that is executed by a processor of the computing device. The resource management program is configured to operate a selected sensor of the plurality of sensors in a default power mode to achieve a selected level of sensor fidelity. The resource management program is also configured to receive user-related information from one or more of the sensors, with the user-related information being selected from the group consisting of audio information, user gaze information, user location information, user movement information, user image information, and user physiological information.

The resource management program is further configured to determine whether target information is detected in the user-related information. Where the target information is detected, the resource management program is configured to adjust the selected sensor to operate in a reduced power mode that uses less power than the default power mode, thereby achieving a reduced level of sensor fidelity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a schematic view of two users in a physical environment using the head-mounted display device of FIG. 2 and the resource management system of FIG. 1 according to an embodiment of the present disclosure.

FIGS. 4A, 4B and 4C are a flow chart of a method for managing resources in a head-mounted display device according to an embodiment of the present disclosure.

DETAILED DESCRIPTION

Figure 1:
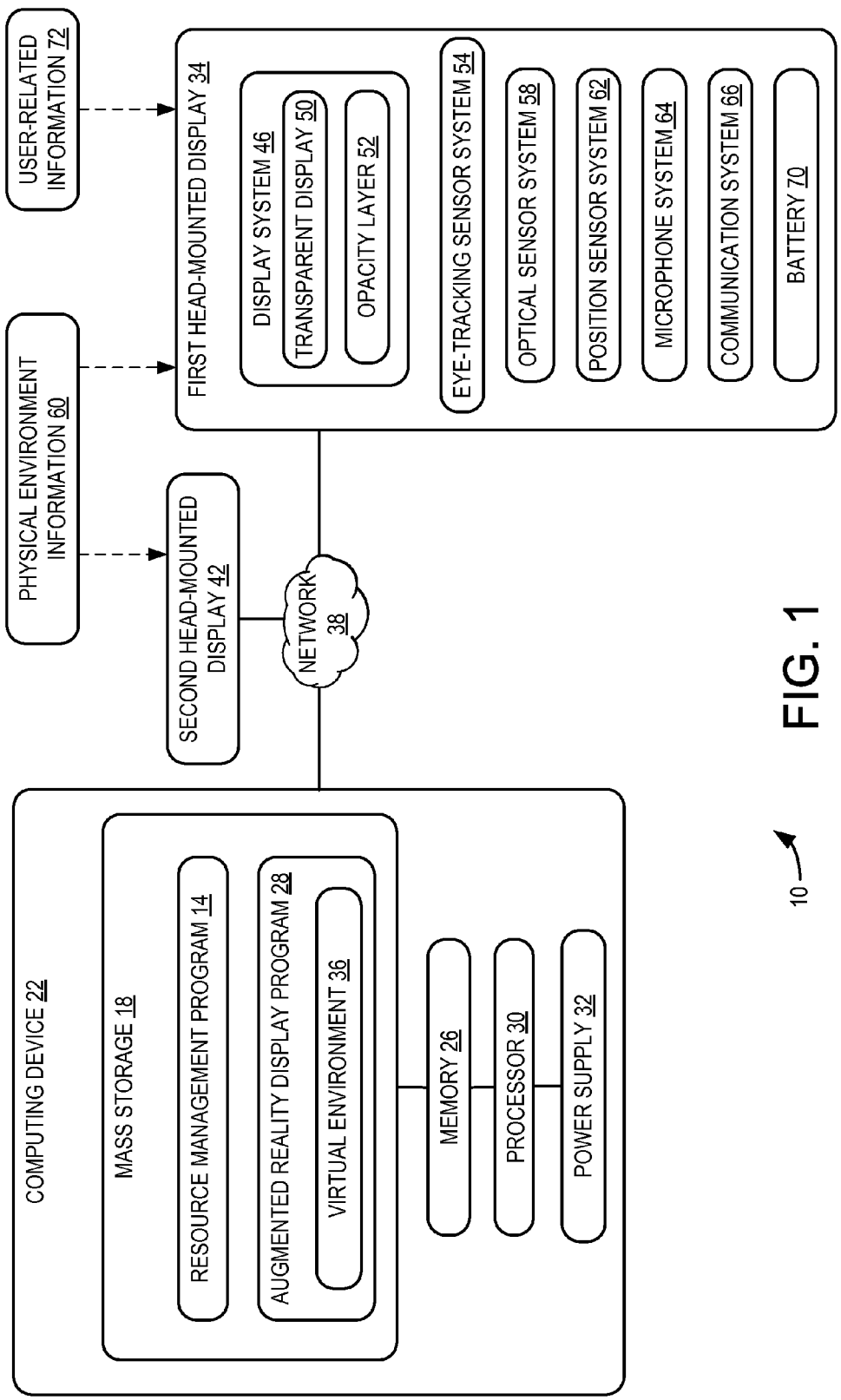
FIG. 1 is a schematic view of a resource management system according to an embodiment of the present disclosure.

FIG. 1 shows a schematic view of one embodiment of a resource management system 10 for managing resources in a head-mounted display (HMD) device. The resource management system 10 includes a resource management program 14 that may be stored in mass storage 18 of a computing device 22. The resource management program 14 may be loaded into memory 26 and executed by a processor 30 of the computing device 22 to perform one or more of the methods and processes described in more detail below. The computing device 22 may further include a power supply 32, such as a battery, for supplying power to components of the computing device.

In one example, the resource management system 10 may include an augmented reality display program 28 that may be stored in mass storage 18 of the computing device 22. The augmented reality display program 28 may generate a virtual environment 36 for display on a display device, such as the first HMD device 34. The virtual environment 36 may include one or more virtual object representations, such as holographic objects. In some examples, the virtual environment 36 may be generated to provide an augmented reality experience in the form of an interactive video game, motion picture experience, or other suitable electronic game or experience. In another example, the augmented reality display program 28 and/or the resource management program 14 may be stored remotely and may be accessed by the computing device 22 over a network to which the computing device is operatively connected, such as network 38.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to the computing system illustrated in FIG. 5.

The computing device 22 may be operatively connected with the first HMD device 34 using a wired connection, or may employ a wireless connection via WiFi, Bluetooth, or any other suitable wireless communication protocol. Additionally, the example illustrated in FIG. 1 shows the computing device 22 as a separate component from the first HMD device 34. It will be appreciated that in other examples the computing device 22 may be integrated into the first HMD device 34.

The computing device 22 also may be operatively connected with one or more additional devices via network 38. In one example, the computing device 22 may communicate with a second HMD device 42 via network 38. Network 38 may take the form of a local area network (LAN), wide area network (WAN), wired network, wireless network, personal area network, or a combination thereof, and may include the Internet.

Figure 2:
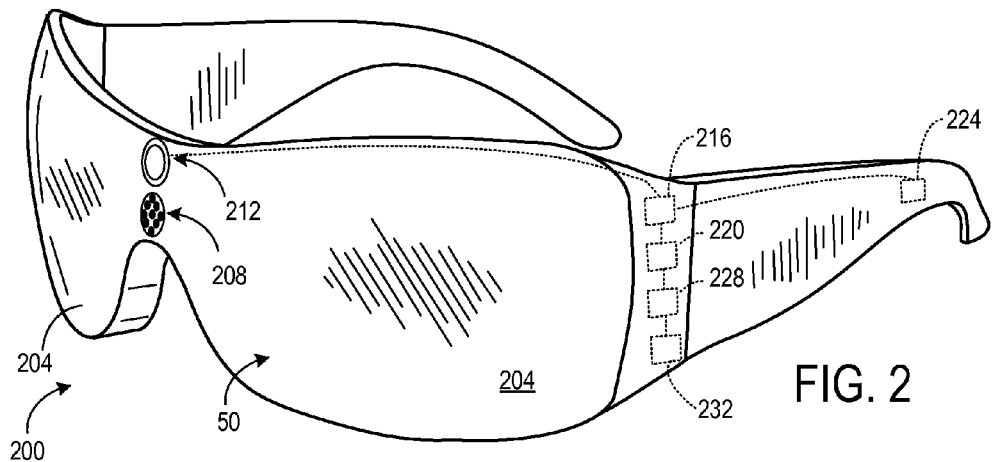
FIG. 2 shows an example head-mounted display device according to an embodiment of the present disclosure.

With reference now also to FIG. 2, one example of an HMD device 200 in the form of a pair of wearable glasses with a transparent display 50 is provided. It will be appreciated that in other examples, the HMD device 200 may take other suitable forms in which a transparent, semi-transparent or non-transparent display is supported in front of a viewer's eye or eyes. It will also be appreciated that the HMD device 34 shown in FIG. 1 may take the form of the HMD device 200, as described in more detail below, or any other suitable HMD device. Additionally, many other types and configurations of display devices having various form factors may also be used. For example, a hand-held display device that provides an augmented reality experience may also be used.

With reference to FIGS. 1 and 2, in this example the first HMD device 34 includes a display system 46 and transparent display 50 that enables images to be delivered to the eyes of a user. The transparent display 50 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent display 50.

The transparent display 50 may also be configured to enable a user to view a physical, real-world object in the physical environment through one or more partially transparent pixels that are displaying a virtual object representation. In one example, the transparent display 50 may include image-producing elements located within lenses 204 (such as, for example, a see-through Organic Light-Emitting Diode (OLED) display). As another example, the transparent display 50 may include a light modulator on an edge of the lenses 204. In this example, the lenses 204 may serve as a light guide for delivering light from the light modulator to the eyes of a user. Such a light guide may enable a user to perceive a 3D virtual image located within the physical environment that the user is viewing, while also allowing the user to view physical objects in the physical environment.

In other examples, transparent display 50 may support selective filtering of light received from the physical environment before reaching an eye of a user wearing the HMD device 200. Such filtering may be performed on a pixel-by-pixel basis or on groups of pixels. In one example, transparent display 50 may include a first display layer that adds light in the form of one or more illuminated pixels, and a second display layer that filters ambient light received from the physical environment. These layers may have different display resolution, pixel density, and/or display capabilities.

The second display layer may include one or more opacity layers 52 in which blocking images may be generated. The one or more opacity layers 52 may be integrally formed within the transparent display 50. In other examples, the one or more opacity layers 52 may be separately mounted or attached adjacent to the transparent display 50, such as in the form of a separate visor.

The first HMD device 34 may also include various systems and sensors. For example, the first HMD device 34 may include an eye-tracking sensor system 54 that utilizes at least one inward facing sensor 208 (see FIG. 2). The inward facing sensor 208 may be an image sensor that is configured to acquire image data in the form of eye-tracking information from a user's eyes. Provided the user has consented to the acquisition and use of this information, the eye-tracking sensor system 54 may use this information to track the position and/or movement of the user's eyes. The eye-tracking sensor system 54 may then determine where and/or at what physical object or virtual object the user is gazing. The inward facing sensor 208 may also include one or more optical sensors for capturing visible spectrum and/or infrared light. Such sensors may be used, for example, to determine the proximity of a user's face to the HMD device 34.

The first HMD device 34 may also include an optical sensor system 58 that utilizes at least one outward facing sensor 212, such as an optical sensor. Outward facing sensor 212 may detect movements within its field of view, such as gesture-based inputs or other movements performed by a user or by a person or physical object within the field of view. Outward facing sensor 212 may also capture image information and depth information from a physical environment and physical objects within the environment. For example, outward facing sensor 212 may include a depth camera, a visible light camera, an infrared light camera, and/or a position tracking camera. In some examples, outward facing sensor 212 may include one or more optical sensors for observing visible spectrum and/or infrared light from real-world lighting conditions in the physical environment. Such sensors may include, for example, a charge coupled device image sensor that may detect RGB ambient light and/or black and white ambient light.

As noted above, the first HMD device 34 may include depth sensing via one or more depth cameras. Each depth camera may include left and right cameras of a stereoscopic vision system, for example. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras. The first HMD device 34 may also include an infrared projector to assist in structured light and/or time of flight depth analysis.

In other examples, gesture-based and other motion inputs from the user and/or persons in the physical environment may also be detected via one or more depth cameras. For example, outward facing sensor 212 may include two or more optical sensors with known relative positions for creating depth images. Using motion results from these optical sensors with known relative positions, such depth images may be generated and mapped to gesture-based and other motion inputs. In still other examples, laser return, ultrasound, infrared, and/or any other suitable depth detection technology may be used and is within the scope of the present disclosure.

Outward facing sensor 212 may capture images of a physical environment in which the user is situated. As discussed in more detail below, such images may be part of physical environment information 60 that may be received by the first HMD device 34 and provided to the computing device 22. In one example, the augmented reality display program 28 may include a 3D modeling system that uses such input to generate virtual environment 36 that models the physical environment that is captured.

The first HMD device 34 may also include a position sensor system 62 that utilizes one or more motion sensors 216 to enable position tracking and/or orientation sensing of the first HMD device, and determine a position of the HMD device within a physical environment. For example, the position sensor system 62 may be utilized to determine a head pose orientation of a user's head. In one example, position sensor system 62 may comprise an inertial measurement unit configured as a six-axis or six-degree of freedom position sensor system. This example position sensor system may, for example, include three accelerometers and three gyroscopes to indicate or measure a change in location of the first HMD device 34 within three-dimensional space along three orthogonal axes (e.g., x, y, z), and a change in an orientation of the HMD device about the three orthogonal axes (e.g., roll, pitch, yaw).

Position sensor system 62 may support other suitable positioning techniques, such as GPS or other global navigation systems. For example, position sensor system 62 may include a wireless receiver (e.g., a GPS receiver or cellular receiver) to receive wireless signals broadcast from satellites and/or terrestrial base stations. These wireless signals may be used to identify a geographic location of the first HMD device 34.

Positioning information obtained from wireless signals received by the first HMD device 34 may be combined with positioning information obtained from the motion sensors 216 to provide an indication of location and/or orientation of the first HMD device 34. While specific examples of position sensor systems have been described, it will be appreciated that other suitable position sensor systems may be used.

Motion sensors 216 may also be employed as user input devices, such that a user may interact with the first HMD device 34 via gestures of the neck and head, or even of the body. Further, in some examples the motion sensors 216 may have relatively low power requirements. In these cases, information from the motion sensors 216 may be used in lieu of information from more complex sensor systems having greater power requirements. It follows that the more complex sensor systems may be powered down or off to conserve system resources. Non-limiting examples of motion sensors include an accelerometer, a gyroscope, a compass, and an orientation sensor, which may be included as any combination or subcombination thereof.

The first HMD device 34 may also include a microphone system 64 that includes one or more microphones 220. In some examples, and as described in more detail below, an array of microphones 220 may receive audio input from a user and/or audio input from a physical environment around the user. Additionally or alternatively, one or more microphones separate from the first HMD device 34 may be used to receive audio input.

In other examples, audio may be presented to the user via one or more speakers 224 on the first HMD device 34. Such audio may include, for example, music, instructions, and/or other communication from the augmented reality display program 28 or other sources.

In other examples, the first HMD device 34 may also include a communication system 66 and associated transceiver 228 for broadcasting wireless signals such as Wi-Fi signals, Bluetooth signals, etc., and receiving such signals from other devices. These wireless signals may be used, for example, to exchange data and/or create networks among devices.

The first HMD device 34 may also include a processor 232 having a logic subsystem and a storage subsystem, as discussed in more detail below with respect to FIG. 5, that are in communication with the various input and output devices of the HMD device. Briefly, the storage subsystem may include instructions that are executable by the logic subsystem, for example, to receive and forward inputs from the sensors to computing device 22 (in unprocessed or processed form) via the communication system 66, and to present images to the user via the transparent display 50.

The first HMD device 34 may also include a battery 70 or other suitable portable power supply that provides power to the various components of the HMD device.

It will be appreciated that the first HMD device 34 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the first HMD device 34 may include additional and/or alternative sensors, cameras, microphones, input devices, output devices, etc. without departing from the scope of this disclosure. Further, the physical configuration of the first MD device 34 and its various sensors and subcomponents may take a variety of different forms without departing from the scope of this disclosure.

With reference now also to FIG. 3, descriptions of example embodiments and use cases utilizing the resource management system 10 and first HMD device 34 will now be provided. FIG. 3 is a schematic illustration of a first user 304 and a second user 308 located in a physical environment. In this example the physical environment is a room 300 that includes physical objects such as a wall 312, a picture 316 mounted on the wall, a table 320 and a bookcase 324. The first user 304 may wear the first HMD device 34 and the second user 308 may wear the second HMD device 42 (see also FIG. 1). The second HMD device 42 may have a construction and operation that is substantially similar to the first HMD device 34 described above, and both HMD devices may take the form of HMD device 200.

The display system 46 of the first HMD device 34 may present a holographic object to the eyes of the first user 304 in the form of a virtual wizard 326 located on the table 320. Similarly, the display system of the second HMD device 42 may present the virtual wizard 326 to the eyes of the second user 308 such that the wizard appears located on the table 320. In this manner, FIG. 3 shows the room 300 as populated with the virtual wizard 326 that is positioned in the room according to the virtual environment 36 that is generated by the augmented reality display program 28 of the first HMD device 34 or second HMD device 42.

It will be appreciated that the virtual environment 36 may model the physical environment and may be based on one or more of user eye-tracking information, lighting information from the physical environment, depth information, image information, and position and/or orientation information received from the first HMD device 34 and/or second HMD device 42. In one example, such information may be compiled to generate a virtual environment 36 that comprises a 3D map of the room 300 and includes one or more holographic objects.

As described further in the various use cases discussed below, the resource management program 14 may be configured to operate a selected sensor of the first HMD device 34 in a default power mode to achieve a selected level of sensor fidelity. In one example, the selected sensor may be from the optical sensor system 58, the position sensor system 62, the eye-tracking sensor system 54 or the microphone system 64. The selected level of sensor fidelity for a given sensor may correspond to a predetermined sensor resolution, sensor frequency or sampling rate, or other suitable operational quality.

The first HMD device 34 may receive user-related information 72 via the eye-tracking sensor system 54, optical sensor system 58, position sensor system 62, and/or microphone system 64. The resource management program 14 may be configured to receive the user-related information 72 from the first HMD device 34. In one example, the user-related information may include audio information, user gaze information, user location information, user movement information, user image information, and/or user physiological information. Using this user-related information, the resource management program 14 may be configured to determine whether target information is detected in the user-related information. Where the target information is detected, the resource management program 14 may be configured to adjust a selected sensor to operate in a reduced power mode that uses less power than the default power mode. The reduced power mode of the sensor may correspond to a reduced level of sensor fidelity.

In some examples, the target information may include context-identifying audio information, a user gaze that is fixed on a holographic object or a physical object, a user location at a predetermined location, movement of the user below a movement threshold, image information indicating a user body part, and/or awareness-related user physiological information that indicates a user awareness below an awareness threshold.

In one example, the first user 304 may be wearing the first HMD device 34 while driving from a shopping mall to the user's home. While driving a GPS sensor in the position sensor system 62 of the first HMD device 34 may be operated in a default power mode. The default power mode may correspond to a default location sampling rate that yields a default location accuracy. Such default location accuracy may be sufficient to provide, for example, various location-based services to the user 304 via the first HMD device 34.

The user 304 may arrive at home and walk inside the user's house. At this point the resource management program 14 may receive user location information from the GPS sensor indicating that the user is at the predetermined location of the user's house. When the resource management program 14 detects this target information, the resource management program may adjust the GPS sensor to operate in a reduced power mode that corresponds to a reduced location sampling rate and a reduced location accuracy. In one example, the reduced power mode may correspond to a powered-off state in which the GPS sensor is turned off. Advantageously, by selectively reducing power to the GPS sensor in this manner, power consumption of the first HMD device 34 may be reduced, and corresponding battery life may be increased.

It will be appreciated that when the user is in the user's house, location information generated by the GPS sensor may provide limited value to some of the augmented reality experiences typically enjoyed by the user 304 in the user's house. Accordingly, the predetermined location of the user's house may be selected as target information, and the corresponding reduced power mode for the GPS sensor may be employed in a manner that does not degrade the quality of the augmented reality experience as perceived by the user 304. Additionally, and as described in more detail below for other use cases, additional reduced power modes for other sensors and corresponding to other target information may similarly be employed in a manner designed to avoid degrading user-perceived augmented reality experiences.

With reference to FIG. 3, in another example the first user 304 may be sitting in the room 300 of the user's house. The first user 304 may be engrossed in a 3-D movie experience presented via the first HMD device 34 and featuring the virtual wizard 326. In this example the target information may include movement of the user that is below a movement threshold. For example, the movement threshold may be defined as a boundary around the first user 304 that the user has not crossed within a predetermined amount of time. In one example, the boundary may be a one meter radius circle that encircles the first user 304, and the predetermined amount of time may be 30 seconds. It will be appreciated that any suitable boundary distance or configuration and any suitable predetermined amount of time may be used without departing from the scope of this disclosure. It will also be appreciated that different boundary distances and amounts of time may be more suitable for different locations and/or contexts.

In this example, when the user sits in place for more than 30 seconds, the resource management program 14 may be configured to detect that the user's movement is below the movement threshold. Based on detecting movement below the movement threshold, the resource management program 14 may adjust the position sensor system 62 to operate in a reduced power mode. For example, the reduced power mode may correspond to the GPS sensor operating at a lower sampling rate or being powered-off.

In other examples and based on detecting movement below the movement threshold, the resource management program 14 may adjust one or more other sensors to operate in a reduced power mode. For example, a visible light camera in optical sensor system 58 may be adjusted to a reduced power mode that corresponds to a slower refresh rate than a default refresh rate of, for example, 30 Hz.

In another example, first user 304 may be gazing at the virtual wizard 326, as indicated by gaze line 330, or at the picture 316, indicated by gaze line 334. In this example the target information may include the user's gaze being fixed on a holographic object or a physical object. The user's gaze may be determined to be fixed when it remains trained on a holographic object or a physical object for more than a predetermined amount of time, such as 2 seconds. It will be appreciated other predetermined amounts of time may be used such as, for example, 1 second, 3 seconds, 10 seconds, 1 minute or any other suitable amount of time, without departing from the scope of this disclosure. Additionally, the resource management program 14 may use eye-tracking information received from the eye-tracking sensor system 54 to determine that the user 304 is gazing at the virtual wizard 326 or the picture 316.

In this example, when the resource management program 14 detects that the user has gazed at an object for more than the predetermined amount of time, the resource management program may be configured to adjust the optical sensor system 58 to operate in a reduced power mode. For example, the reduced power mode may correspond to a visible light camera operating at a slower refresh rate than a default refresh rate, or to a depth camera operating at a slower refresh rate than a default refresh rate. In another example, the reduced power mode may correspond to an image sensor of the inward facing sensor 208 recording images of a non-dominant eye of the user 304 at a slower refresh rate than the default refresh rate, or ceasing to record images of the non-dominant eye. In another example, the reduced power mode may correspond to detecting the focus of the user 304 using a single eye gaze ray intersection with a holographic object, as opposed to using dual eye gaze ray intersections.

In still another example, the user 304 may be in a location that presents a complex and visually detailed scene including high contrast areas. In this example, the target information may include the visually complex, high contrast scene at which the user 304 is gazing. When the resource management program 14 detects that the user is gazing at this scene, the program may be configured to adjust the display system 46 to improve the visibility of the scene. For example, the display system 46 may be adjusted to increase the brightness of one or more virtual images, use less complex fonts, leverage more complex rendering of characters, and/or introduce new or complementary backgrounds. Additionally, the resource management program 14 may also be configured to decrease power to one or more sensors, such as a GPS sensor in the position sensor system 62.

In another example, the microphone system 64 may receive target information in the form of context-identifying audio information. Such audio information may be interpreted by the resource management program 14 to identify a current context and/or location of the user 304. In this manner and based on the context-identifying audio information, the resource management program 14 may be configured to adjust one or more of the sensors of the first HMD device 34 to operate in a reduced power mode. For example, the first user 304 may be riding a bus and the resource management program 14 may interpret the sounds of the bus engine and the bus driver announcements to determine that the first user is on a bus. Based on this context-identifying audio information, the resource management program 14 may operate the depth camera of the optical sensor system 58 in a reduced power mode, for example.

In another example, the microphone system 64 may receive target information in the form of audio information comprising the user's voice. In one example, the user 304 may inform the resource management program 14 that the user desires to use the first HMD device 34 for a continuous amount of time without recharging, such as five hours for example. Using such audio information, the resource management program 14 may manage the power demands of the first HMD device 34 over the next five hours by adjusting one or more of the sensors to operate in a reduced power mode.

In another example, one or more of the sensors of the first HMD device 34 may receive target information in the form of awareness-related user physiological information that indicates a user awareness below an awareness threshold. For example, eye movements of the first user 304 may be tracked by the eye-tracking sensor system 54. The resource management program 14 may use such eye-tracking information to estimate a user awareness level of the first user 304.

For example and with reference again to FIG. 3, the first HMD device 34 may be displaying a 3-D movie to the user 304 that includes the virtual wizard 326. The resource management program 14 may analyze a pattern of user eye-movements and determine that the user's awareness or interest in the 3-D move is below an awareness threshold. In one example, the awareness threshold may correlate to a frequency with which the user 304 looks away from the wizard 326. For example, the awareness threshold may comprise the user 304 looking away from the wizard 326 for more than 20 seconds per minute over a 3 minute span. It will be appreciated any other suitable period of time may be used without departing from the scope of this disclosure. When the resource management program 14 determines that the user's awareness is below this threshold, the resource management program 14 may adjust one or more of the sensors to operate in a reduced power mode.

It will be appreciated that various other types and forms of awareness-related user physiological information may be received by other sensors of the first HMD device 34. Such other awareness-related user physiological information may include, but is not limited to, heart rate, pulse, hemoglobin saturation, skin conductivity, respiration, perspiration, and brainwave activity. Such information may also be used by the resource management program 14 to determine a level of user awareness or interest.

In still another example, one or more of the sensors of the optical sensor system 58 of the first HMD device 34 may receive target information in the form user image information indicating a user body part. For example, the first user 304 may be attempting to hail a taxicab on a busy city street by vigorously waving the user's arms in the air. A depth camera in the optical sensor system 58 may capture image data of the user's arms waving. The resource management program 14 may analyze the depth camera image data and determine that the user is engaged in an urgent signaling activity. Accordingly, the resource management program 14 may adjust one or more of the sensors that may be non-essential to such signaling activities to operate in a reduced power mode.

In another example, power to one or more of the sensors may be reduced when the user 304 is performing a task that the user generally performs without the use of one or more sensors. For example, when the user 304 is driving the user may have a history of using voice input to navigate virtual menus, and correspondingly almost never use hand gestures. Accordingly, whenever the resource management program 14 determines that the user 304 is driving and engaging with a virtual menu, the program may adjust a depth camera in the optical sensor system to operate in a reduced power mode. It will be appreciated that different users may have different usage patterns, and that the resource management program 14 may customize sensor operation according to the usage patterns of a given user.

In another example and with reference also to FIG. 1, the resource management program 14 may be configured to receive physical environment information 60 from one or more of the sensors of the first HMD device 34. The resource management program 14 may then determine whether target information is detected in the physical environment information 60. With reference to FIG. 3, in one example the physical environment information may include physical object image data from the room 300. For example, the optical sensor system 58 may receive image data showing the table 320, picture 316, wall 312 and bookcase 324. Using such image data, the resource management program 14 may determine that the user 304 is in a room 300 of the user's house. Accordingly, the resource management program 14 may adjust a GPS sensor in the position sensor system 62 to operate in a reduced power mode.

It will be appreciated that in other examples, the resource management program 14 may be configured to receive other types and forms of physical environment information 60 via the first HMD device 34. Such other types and forms of physical environment information 60 may include, but are not limited to, audio information, ambient light levels, physical object location, orientation and surface information, and environmental condition information such as temperature.

In another example, the resource management program 14 may be configured to receive physical environment information 60 via network 38 from the second HMD device 42 that is external to the first HMD device 34. In the example illustrated in FIG. 3, the second HMD device 42 that is being worn by the second user 308 may receive physical environment information 60 and transmit such information to the computing device 22 and resource management program 14 via network 38.

In one example, the first user 304 and the second user 308 may walk into the room 300. Both the first HMD device 34 worn by the first user 304 and the second HMD device 42 worn by the second user 308 may capture similar image data from the physical objects in the room 300. The second HMD device 42 may transmit the image data it captures to the first HMD device 34. Advantageously, based on receiving the image data from the second HMD device 42, the resource management program 14 may adjust one or more sensors of the optical sensor system 58 in the first HMD device 34 to operate in a reduced power mode.

It will be appreciated that in some examples two or more HMD devices may communicate to determine which HMD device will capture and transmit data and which HMD device(s) will receive the data. In one example, the HMD device having the most remaining battery life may be selected to capture and transmit the data to other devices. In other examples any other suitable criteria may be used to determine which HMD device may be selected to capture and transmit the data. It will also be appreciated that other types of physical environment data captured by other sensors may also be captured and transmitted by one HMD device and received by one or more other HMD devices from the capturing device.

In other examples the first HMD device 34 and/or second HMD device 42 may receive physical environment information 60 and/or other information via network 38 from other devices and sources external to the HMD devices. For example, first HMD device 34 may receive GPS location information from a nearby indoor location beacon. In another example, first HMD device 34 may receive information from a smart phone or tablet computer to which the device is paired.

In still another example, an optical sensor in the optical sensor system 58 may capture physical environment information 60 in the form of physical object image data. The resource management program 14 may be configured to determine whether the optical sensor has captured a threshold amount of the physical object image data. For example, a threshold amount of image data may be 100 MB of image data. In this example, when the optical sensor has captured 100 MB of image data of the physical object, the resource management program 14 may adjust the optical sensor to operate in a reduced power mode and at a corresponding reduced level of fidelity. It will be appreciated that other sensors may also be monitored to determine whether threshold amounts of other types of physical object information have been reached, whereupon such sensors may be adjusted to operate in a reduced power mode. It will also be appreciated that any other suitable threshold amount of image data may be utilized without departing from the scope of this disclosure, and such threshold amount may be adjusted based on location or other context-related factors.

In still another example, the resource management program 14 may be configured to detect target audio. While the target audio is not detected, one or more microphones 220 of the first HMD device 34 may be operated at a default, slower polling frequency. When target audio is received by a microphone 220 and detected by the resource management program 14, the program may adjust the microphone to operate at a faster polling frequency that is greater than the slower polling frequency. Advantageously, in this example the resource management program 14 may use the default power mode for the microphone 220 as long as the target audio is not detected. In some examples the target audio may include recognized speech of the user 304, an emergency broadcast message, a predetermined third party recognized speech, such as speech of a user's spouse or child, or any other suitable target audio.

In still another example, using an eye-tracking sensor of the eye-tracking sensor system 54 the resource management program 14 may detect a user's gaze at a holographic object or a physical object. With reference again to FIG. 3, in one example the user 304 may be gazing at the picture 316 on the wall 312. Based on detecting the user's gaze, and given that the user 304 is not looking at the virtual wizard 326, the resource management program 14 may reduce an illumination output of the display system 46 of the first HMD device 34. More particularly, the resource management program 14 may reduce the brightness of the virtual wizard 326 generated by the display system 46, thereby reducing the power consumed by the display system 46. In another example, the resource management program 14 may utilize the opacity layer 52 in the display system 46 to block more ambient light from reaching the eyes of the user 304. In this manner, the virtual wizard 326 and other holographic objects may be displayed at a reduced brightness, thereby reducing power consumed by the display system 46.

In another example, a depth sensor of the optical sensor system 58 may be operated at a default sensing level that includes illuminating a default illumination area of a predetermined size. Using image data from the depth sensor, the resource management program 14 may determine that the size of a current illumination area in front of the first user 304 is smaller than the predetermined size of the default illumination area. Accordingly, the resource management program 14 may be configured to reduce the illumination output of the depth sensor to correspond to the smaller size of the current illumination area. In this manner, the power consumed by the illumination system of the depth sensor may also be reduced.

In another example, the resource management system 10 may include other operating modes, such as a fast response mode which may be selected to prioritize sensor data collection and associated fidelity over power management. In this example, when the resource management system 10 or a user selects the fast response mode, such mode may override the resource management program 14 to maintain or increase power consumed by one or more sensors, and thereby increase sensor fidelity. For example, when a user transitions into a new environment, the resolution, frequency, and/or power of one or more optical sensors may be increased to better capture the new physical space the user is in. In other examples, pixel binning may be used to achieve a lower resolution depth display for detecting coarse hand gestures at a higher frame rate (lower fidelity), or higher resolution may be used at a lower frame rate for surface reconstruction.

In another example, the resource management program 14 may be configured to determine that a user has removed an HMD device from the user's head. The resource management program 14 may then adjust one or more sensors to operate in a reduced power mode. For example, when the first user 304 removes the HMD device 42 and places it to rest on a surface, the position sensor system 62 may detect no movement. After a predetermined period of no movement, such as 30 seconds for example, the resource management program 14 may adjust the position sensor system 62 to operate in a reduced power mode.

In another example, the resource management program 14 may be configured to determine that a user is falling asleep or is asleep. The resource management program 14 may then adjust one or more sensors to operate in a reduced power mode. For example, over a predetermined period of time, such as 30 seconds for example, the inward facing sensor 208 may provide user image information showing the eyelids of the first user 304 are closed. Based on this information the resource management program 14 may determine that the first user 304 is sleeping, and may correspondingly adjust one or more sensors to operate in a reduced power mode.

In another example, over a predetermined period of time, such as one minute for example, the position sensor system 62 may provide position data showing that the first user's head is nodding downwardly in a repetitive fashion. Based on this data the resource management program 14 may determine that the first user 304 is falling asleep, and may correspondingly adjust one or more sensors to operate in a reduced power mode.

In another example, target information may also be detected in the virtual environment that a user is experiencing. For example, given a particular user context that is informed by an augmented reality application that the user is running, the resource management program 14 may adjust one or more sensors based on target information from the virtual environment.

Figure 4B:
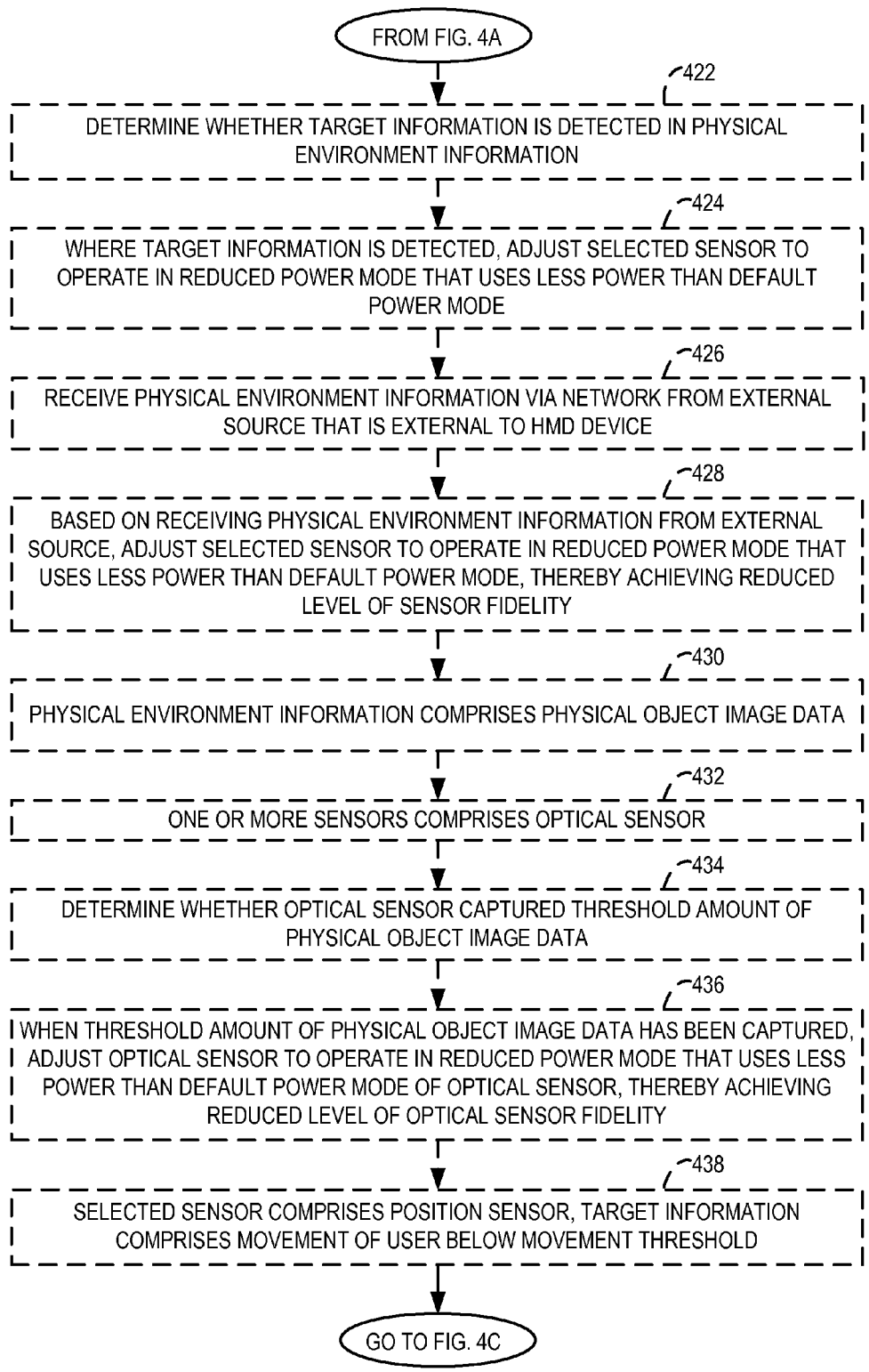
Figure 4C:
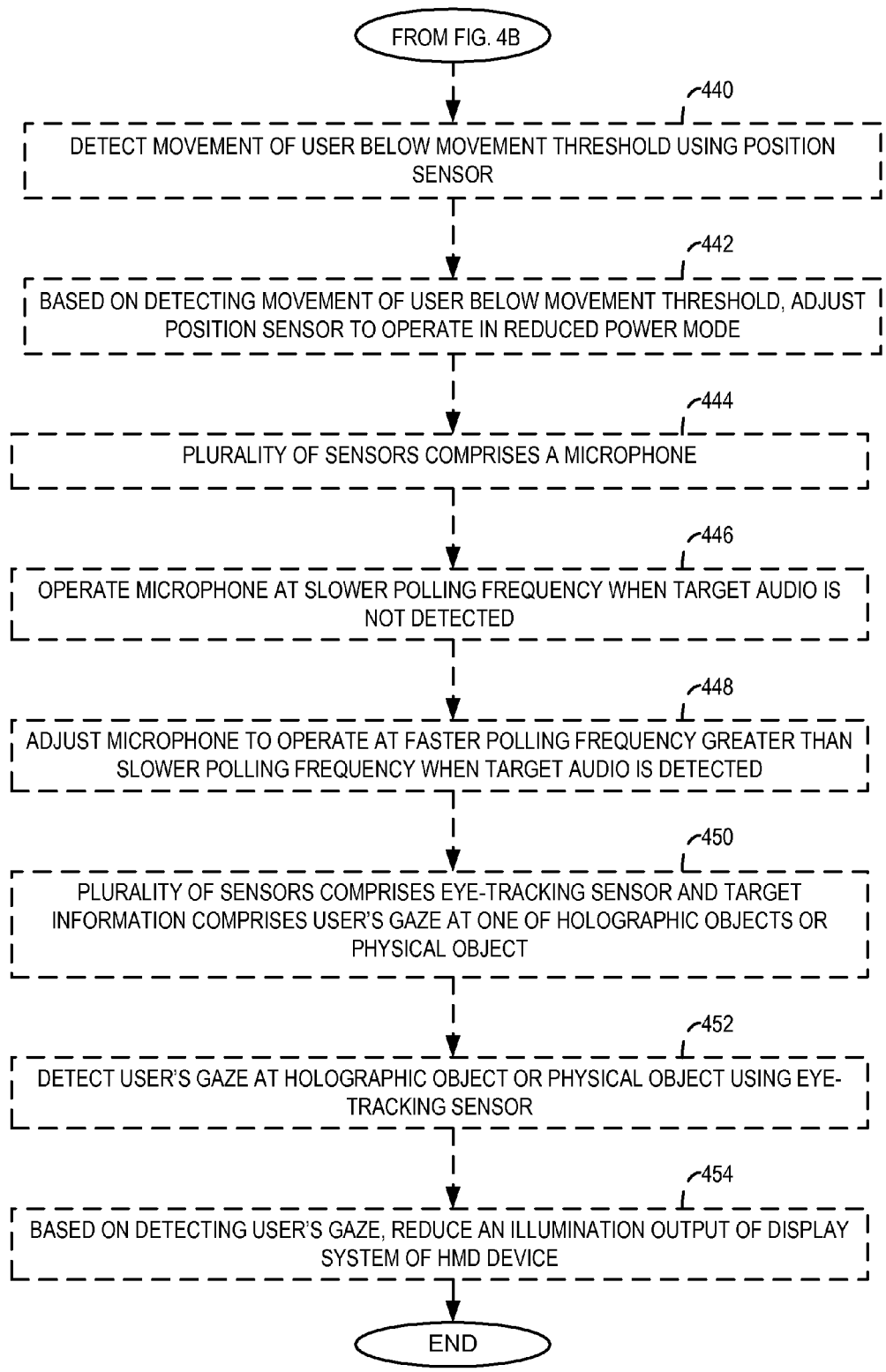

FIGS. 4A, 4B and 4C illustrate a flow chart of a method 400 for managing resources in an HMD device according to an embodiment of the present disclosure. The following description of method 400 is provided with reference to the software and hardware components of the resource management system 10 described above and shown in FIGS. 1 and 2. It will be appreciated that method 400 may also be performed in other contexts using other suitable hardware and software components.

With reference to FIG. 4A, at 404 the method 400 may include providing an HMD device 34 configured to be worn by a user and operatively connected to a computing device 22, with the HMD device including a plurality of sensors and a display system 46 for presenting holographic objects. At 408 the method 400 may include operating a selected sensor of the plurality of sensors in a default power mode to achieve a selected level of sensor fidelity. At 412 the method 400 may include receiving user-related information from one or more of the plurality of sensors, with the user-related information being selected from the group consisting of audio information, user gaze information, user location information, user movement information, user image information, and user physiological information.

At 414 the method 400 may include determining whether target information is detected in the user-related information. At 416 the method 400 may optionally include selecting the target information from the group consisting of context-identifying audio information, a user gaze that is fixed on a holographic object or a physical object, a user location at a predetermined location, movement of the user below a movement threshold, image information indicating a user body part, and awareness-related user physiological information that indicates a user awareness below an awareness threshold. At 418 and where the target information is detected, the method 400 may include adjusting the selected sensor to operate in a reduced power mode that uses less power than the default power mode, thereby achieving a reduced level of sensor fidelity.

At 420 the method 400 may optionally include receiving physical environment information from one or more of the plurality of sensors. With reference now to FIG. 4B, at 422 the method 400 may optionally include determining whether the target information is detected in the physical environment information. At 424 and where the target information is detected, the method 400 may optionally include adjusting the selected sensor to operate in the reduced power mode that uses less power than the default power mode, thereby achieving a reduced level of sensor fidelity.

At 426 the method 400 may optionally include receiving the physical environment information via a network from an external source that is external to the HMD device. At 428 and based on receiving the physical environment information from the external source, the method 400 may optionally include adjusting the selected sensor to operate in the reduced power mode. At 430 the physical environment information may optionally comprise physical object image data. At 432 one or more of the plurality of sensors may optionally comprise an optical sensor. At 434 the method 400 may optionally include determining whether the optical sensor has captured a threshold amount of physical object image data. At 436 and when the threshold amount of physical object image data has been captured, the method 400 may optionally include adjusting the optical sensor to operate in the reduced power mode that uses less power than the default power mode, thereby achieving a reduced level of sensor fidelity.

At 438 the selected sensor may optionally comprise a position sensor, and the target information may optionally comprise movement of the user below a movement threshold. With reference now to FIG. 4C, at 440 the method 400 may optionally include detecting that the movement of the user is below the movement threshold using the position sensor. At 442 and based on detecting the movement of the user below the movement threshold, the method 400 may optionally include adjusting the position sensor to operate in the reduced power mode.

At 444 the plurality of sensors may optionally comprise a microphone. At 446 the method 400 may optionally include operating the microphone at a slower polling frequency when target audio is not detected. At 448 and when the target audio is detected, the method 400 may optionally include adjusting the microphone to operate at a faster polling frequency that is greater than the slower polling frequency.

At 450 the plurality of sensors may optionally comprise an eye-tracking sensor, and the target information may optionally comprise the user's gaze at one of the holographic objects or at a physical object in the physical environment. At 452 the method 400 may optionally include detecting the user's gaze at one of the holographic objects or the physical object using the eye-tracking sensor. At 454 and based on detecting the user's gaze, the method 400 may optionally include reducing an illumination output of the display system of the HMD device.

Figure 5:
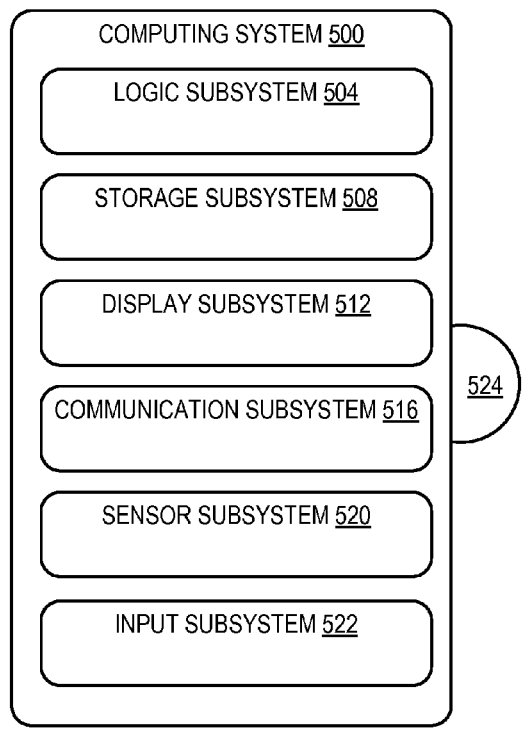
FIG. 5 is a simplified schematic illustration of an embodiment of a computing system.

FIG. 5 schematically shows a nonlimiting embodiment of a computing system 500 that may perform one or more of the above described methods and processes. Computing device 22 may take the form of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. As noted above, in some examples the computing system 22 may be integrated into an HMD device.

As shown in FIG. 5, computing system 500 includes a logic subsystem 504 and a storage subsystem 508. Computing system 500 may optionally include a display subsystem 512, a communication subsystem 516, a sensor subsystem 520, an input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some embodiments, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 5 also shows an aspect of the storage subsystem 508 in the form of removable computer-readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 512 may be used to present a visual representation of data held by storage subsystem 508. As the above described methods and processes change the data held by the storage subsystem 508, and thus transform the state of the storage subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or storage subsystem 508 in a shared enclosure, or such display devices may be peripheral display devices. The display subsystem 512 may include, for example, the display system 46, transparent display 50, and opacity layer 52 of the first HMD device 34.

When included, communication subsystem 516 may be configured to communicatively couple computing system 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Sensor subsystem 520 may include one or more sensors configured to sense different physical phenomenon (e.g., visible light, infrared light, sound, acceleration, orientation, position, etc.) as described above. For example, the sensor subsystem 520 may comprise one or more eye-tracking sensors, image sensors, microphones, motion sensors such as accelerometers, touch pads, touch screens, and/or any other suitable sensors. Sensor subsystem 520 may be configured to provide observation information to logic subsystem 504, for example. As described above, observation information such as eye-tracking information, image information, audio information, ambient lighting information, depth information, position information, motion information, and/or any other suitable sensor data may be used to perform the methods and processes described above.

In some embodiments sensor subsystem 520 may include a depth camera (e.g., outward facing sensor 212 of FIG. 2). The depth camera may include left and right cameras of a stereoscopic vision system, for example. Time-resolved images from both cameras may be registered to each other and combined to yield depth-resolved video. In other embodiments the depth camera may be a structured light depth camera or a time-of-flight camera, as described above In some embodiments, sensor subsystem 520 may include a visible light camera, such as a digital camera. Virtually any type of digital camera technology may be used without departing from the scope of this disclosure. As a non-limiting example, the visible light camera may include a charge coupled device image sensor.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the resource management system 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A resource management system, comprising:
   a head-mounted display device configured to be worn by a user and operatively connected to a computing device, the head-mounted display device including a plurality of sensors and a display system for presenting holographic objects, and
   a resource management program executed by a processor of the computing device, the resource management program configured to:
      operate a selected sensor of the plurality of sensors in a default power mode to achieve a selected level of sensor fidelity;
      receive user-related information from one or more of the plurality of sensors, the user-related information selected from the group consisting of audio information, user gaze information, user location information, user movement information, user image information, and user physiological information;
      determine whether target information is detected in the user-related information; and
      when the target information is detected, among the plurality of sensors adjust only the selected sensor to operate in a reduced power mode that uses less power than the default power mode, thereby achieving a reduced level of sensor fidelity;
   wherein the plurality of sensors includes an outward facing image sensor, an eye-tracking sensor, and a position sensor, and
   wherein adjusting only the selected sensor to operate in the reduced power mode includes:
      in response to detecting the target information in the user-related information received from the outward facing image sensor, one or more of reducing a refresh rate and a resolution of the outward facing image sensor,
      in response to detecting the target information received from the eye-tracking sensor, reducing a refresh rate of the eye-tracking sensor, and
      in response to detecting the target information received from the position sensor, reducing a sampling rate of the position sensor,
   wherein the resource management system is configured to override the resource management program and adjust the selected sensor to operate in a fast response mode in response to a transition of the head-mounted display device into a new environment, the fast response mode using more power than the reduced power mode, thereby achieving an increased level of sensor fidelity.

2. The resource management system of claim 1, wherein the target information is selected from the group consisting of context-identifying audio information, a user gaze that is fixed on one of the holographic objects or the physical object, a user location at a predetermined location, movement of the user below a movement threshold, image information indicating a user body part, and awareness-related user physiological information that indicates a user awareness below an awareness threshold.

3. The resource management system of claim 1, wherein the plurality of sensors further includes a microphone.

4. The resource management system of claim 1, wherein the reduced power mode further comprises a powered-off state.

5. The resource management system of claim 1, wherein the resource management program is further configured to:
receive physical environment information from one or more of the plurality of sensors; and
determine whether the target information is detected in the physical environment information.

6. The resource management system of claim 5, wherein the physical environment information comprises physical object image data, and the resource management program is further configured to:
determine whether the outward facing image sensor has captured a threshold amount of the physical object image data; and
when the threshold amount of the physical object image data has been captured, adjust the outward facing image sensor to operate in the reduced power mode.

7. The resource management system of claim 1, wherein the resource management program is further configured to:
receive physical environment information via a network from an external source that is external to the head-mounted display device; and
based on receiving the physical environment information from the external source, adjust the selected sensor to operate in the reduced power mode.

8. The resource management system of claim 1, wherein the plurality of sensors comprises a microphone, and the resource management program is further configured to:
operate the microphone at a slower polling frequency while target audio is not detected; and
adjust the microphone to operate at a faster polling frequency that is greater than the slower polling frequency when the target audio is detected.

9. The resource management system of claim 1, wherein the target information comprises a user gaze at one of the holographic objects or a physical object, and the resource management program is further configured to:
detect the user gaze at one of the holographic objects or the physical object using the eye-tracking sensor; and
based on detecting the user gaze, reduce an illumination output of the display system of the head-mounted display device.

10. The resource management system of claim 1, wherein the target information comprises movement of the user below a movement threshold, and the resource management program is further configured to:
detect that the movement of the user is below the movement threshold using the position sensor; and
based on detecting the movement of the user below the movement threshold, adjust the position sensor to operate in the reduced power mode.

11. A method for managing resources in a head-mounted display device, comprising:
providing the head-mounted display device configured to be worn by a user and operatively connected to a computing device, the head-mounted display device including a plurality of sensors and a display system for presenting holographic objects;
operating a selected sensor of the plurality of sensors in a default power mode to achieve a selected level of sensor fidelity;
receiving user-related information from one or more of the plurality of sensors, the user-related information selected from the group consisting of audio information, user gaze information, user location information, user movement information, user image information, and user physiological information;
determining whether target information is detected in the user-related information;
when the target information is detected, among the plurality of sensors adjusting only the selected sensor to operate in a reduced power mode that uses less power than the default power mode, thereby achieving a reduced level of sensor fidelity; and
adjusting the selected sensor to operate in a fast response mode in response to a transition of the head-mounted display device into a new environment, the fast response mode using more power than the reduced power mode, thereby achieving an increased level of sensor fidelity;
wherein the plurality of sensors includes an outward facing image sensor, an eye-tracking sensor, and a position sensor, and
wherein adjusting only the selected sensor to operate in the reduced power mode includes:
in response to detecting the target information in the user-related information received from the outward facing image sensor, one or more of reducing a refresh rate and a resolution of the outward facing image sensor,
in response to detecting the target information received from the eye-tracking sensor, reducing a refresh rate of the eye-tracking sensor, and
in response to detecting the target information received from the position sensor, reducing a sampling rate of the position sensor.

12. The method for managing resources of claim 11, wherein the target information is selected from the group consisting of context-identifying audio information, a user gaze that is fixed on one of the holographic objects or a physical object, a user location at a predetermined location, movement of the user below a movement threshold, image information indicating a user body part, and awareness-related user physiological information that indicates a user awareness below an awareness threshold.

13. The method for managing resources of claim 11, further comprising:
receiving physical environment information from one or more of the plurality of sensors; and
determining whether the target information is detected in the physical environment information.

14. The method for managing resources of claim 13, wherein the physical environment information comprises physical object image data, and further comprising:
determining whether the outward facing image sensor has captured a threshold amount of the physical object image data; and
when the threshold amount of the physical object image data has been captured, adjusting the outward facing image sensor to operate in the reduced power.

15. The method for managing resources of claim 11, further comprising:
receiving physical environment information via a network from an external source that is external to the head-mounted display device; and
based on receiving the physical environment information from the external source, adjusting the selected sensor to operate in the reduced power mode.

16. The method for managing resources of claim 11, wherein the plurality of sensors comprises a microphone, and further comprising:

operating the microphone at a slower polling frequency when target audio is not detected; and adjusting the microphone to operate at a faster polling frequency that is greater than the slower polling frequency when the target audio is detected.

17. The method for managing resources of claim 11, wherein the target information comprises a user gaze at one of the holographic objects or a physical object, and further comprising:

detecting the user gaze at one of the holographic objects or the physical object using the eye-tracking sensor; and based on detecting the user gaze, reducing an illumination output of the display system of the head-mounted display device.

18. The method for managing resources of claim 11, wherein the target information comprises movement of the user below a movement threshold, and further comprising:

detecting that the movement of the user is below the movement threshold using the position sensor; and based on detecting the movement of the user below the movement threshold, adjusting the position sensor to operate in the reduced power mode.

19. A resource management system, comprising:

a head-mounted display device configured to be worn by a user and operatively connected to a computing device, the head-mounted display device comprising a display system for presenting holographic objects and a plurality of sensors including an outward facing image sensor, a position sensor, an eye-tracking sensor, and a microphone; and a resource management program executed by a processor of the computing device, the resource management program configured to:

operate a selected sensor of the plurality of sensors in a default power mode to achieve a selected level of sensor fidelity;

receive user-related information from one or more of the plurality of sensors, the user-related information selected from the group consisting of audio information, user gaze information, user location information, user movement information, user image information, and user physiological information;

receive physical environment information from one or more of the plurality of sensors;

determine whether target information is detected in the user-related information or the physical environment information; and when the target information is detected, among the plurality of sensors adjust only the selected sensor to operate in a reduced power mode that uses less power than the default power mode, thereby achieving a reduced level of sensor fidelity;

wherein adjusting only the selected sensor to operate in the reduced power mode includes:

in response to detecting the target information in the user-related information received from the outward facing image sensor, one or more of reducing a refresh rate and a resolution of the outward facing image sensor, in response to detecting the target information received from the eye-tracking sensor, reducing a refresh rate of the eye-tracking sensor, and in response to detecting the target information received from the position sensor, reducing a sampling rate of the position sensor, wherein the resource management system is configured to override the resource management program and adjust the selected sensor to operate in a fast response mode in response to a transition of the head-mounted display device into a new environment, the fast response mode using more power than the reduced power mode, thereby achieving an increased level of sensor fidelity.

* * * * *